United States Patent
Hayes et al.

(10) Patent No.: US 6,866,300 B2
(45) Date of Patent: Mar. 15, 2005

(54) DUAL FLANGE FOR A TUBE JOINT ASSEMBLY

(75) Inventors: Lisa M. Hayes, Farmington Hills, MI (US); Thomas F. Morse, Milford, MI (US); Christopher L. Traskos, Garden City, MI (US)

(73) Assignee: CalsonicKansei North America, Inc., Farmington Hills, MI (US)

( * ) Notice: Subject to any disclaimer, the term of this patent is extended or adjusted under 35 U.S.C. 154(b) by 0 days.

(21) Appl. No.: 10/283,708

(22) Filed: Oct. 29, 2002

(65) Prior Publication Data

US 2004/0080155 A1 Apr. 29, 2004

(51) Int. Cl.⁷ .............................................. F16L 39/00
(52) U.S. Cl. .................................. 285/124.2; 285/124.3
(58) Field of Search ......................... 285/124.1, 124.2, 285/124.3, 124.4, 124.5, FOR 118

(56) References Cited

U.S. PATENT DOCUMENTS

| | | | | | |
|---|---|---|---|---|---|
| 1,231,928 A | * | 7/1917 | Miller et al. | ................ | 122/360 |
| 1,892,781 A | * | 1/1933 | Hoenstine | ................ | 285/138.1 |
| 2,358,367 A | * | 9/1944 | van Meerbeke | ......... | 73/861.65 |
| 3,709,526 A | * | 1/1973 | Cromie | ......................... | 285/73 |
| 3,869,153 A | * | 3/1975 | De Vincent et al. | ..... | 285/124.3 |
| 3,894,706 A | * | 7/1975 | Mizusawa | ................ | 248/68.1 |
| 4,431,152 A | * | 2/1984 | Reed, Jr. | ..................... | 248/65 |
| 4,468,054 A | * | 8/1984 | Orth | ......................... | 285/124.3 |
| 4,900,065 A | * | 2/1990 | Houck | ......................... | 285/73 |
| 5,234,185 A | * | 8/1993 | Hoffman et al. | ............... | 248/56 |
| 5,294,156 A | * | 3/1994 | Kumazaki et al. | ........ | 285/124.2 |
| 5,354,103 A | * | 10/1994 | Torrence et al. | .......... | 285/124.2 |
| 5,387,014 A | * | 2/1995 | Chevallier | .................... | 285/26 |
| 5,467,611 A | * | 11/1995 | Cummings et al. | ........... | 62/299 |
| 5,556,138 A | * | 9/1996 | Nakajima et al. | ........ | 285/124.4 |
| 5,853,201 A | * | 12/1998 | Izumi et al. | ................. | 285/179 |
| 5,860,681 A | * | 1/1999 | Slais | ..................... | 285/137.11 |
| 5,941,483 A | * | 8/1999 | Baginski | ..................... | 248/68.1 |
| 6,070,659 A | * | 6/2000 | Hosoya | ...................... | 165/178 |
| 6,386,593 B1 | * | 5/2002 | Slais et al. | ................... | 285/205 |
| 6,648,375 B1 | * | 11/2003 | Panek | ..................... | 285/124.1 |

FOREIGN PATENT DOCUMENTS

| | | | | | |
|---|---|---|---|---|---|
| EP | | 307780 | * | 3/1989 | ......... 285/FOR 118 |
| NL | | 6404620 | * | 10/1965 | ......... 285/FOR 118 |

* cited by examiner

*Primary Examiner*—James M. Hewitt
(74) *Attorney, Agent, or Firm*—Jordan M. Meschkow; Lowell W. Gresham; Meschkow & Gresham, P.L.C.

(57) ABSTRACT

A flange (62) includes a first flange section (64) configured for coupling with a first tube (102), and a second flange section (66) configured for coupling with a second tube (104). A first mating portion (70) of the first flange section (64) connects to a second mating portion (74) of the second flange section (66) to form the flange (62) for retaining the first tube (102) beside the second tube (104). The flange (62), first tube (102), and second tube (104) form a subassembly (100). The subassembly (100) is subsequently assembled so that a third tube (112) is retained in fluid communication with the first tube (102) and a fourth tube (114) is retained in fluid communication with the second tube (104) to form a tube joint assembly (110) for roughly parallel sets of tubes.

20 Claims, 5 Drawing Sheets

DUAL FLANGE FOR A TUBE JOINT ASSEMBLY

TECHNICAL FIELD OF THE INVENTION

The present invention relates to the field of tube joints. More specifically, the present invention relates to a dual flange for joining two sets of pipes that are roughly parallel to one another.

BACKGROUND OF THE INVENTION

A tube, or pipe joint, is the connection place or piece between two lengths of pipe (i.e., a tube-to-tube joint) or a length of pipe and a component (i.e., a tube-to-component joint). Tube joints are typically formed between a belled (female) pipe end and a spigot (male) pipe end. The belled and spigot pipe ends may have complex interior surfaces, such as bevels and grooves. Typically, an elastomeric gasket or o-ring will fit within a circumferential groove of one of the pipe ends to facilitate the formation of the tube joint with the other of the pipe ends. The gasket forms a tight seal between the inside surface of the belled pipe and the outside surface of the spigot pipe end inserted therein.

Once the spigot pipe end is inserted into the belled pipe end, the tube joint may be further secured by welding, cementing, coupling via a flange, and so forth. A flange is a projecting rim or collar on the pipe, which holds the pipe in place, gives the pipe strength, and facilitates the joining of the pipe to another object, such as another flange on another pipe. Typically, there are one or more bolt holes circled around the outer edge of each flange, with bolts and nuts holding the two flanges together against a gasket that separates them.

FIG. 1 shows a perspective view of a prior art single tube joint 20. Tube joint 20 includes a first pipe 22 having a first flange 24, and a second pipe 26 having a second flange 28. Once the spigot pipe end on, for example, first pipe 22, is inserted into the belled pipe end on, for example, second pipe 26, first and second flanges 24 and 28, respectively, are coupled together using a bolt 30 and nut 32. Thus, tube joint 20 is formed.

Some applications require the use of sets of pipes that run roughly parallel to one another. These applications include, for example, automotive air conditioning plumbing connections from the engine compartment to underbody lines, and from the underbody lines to rear heating, ventilating, and air conditioning (HVAC) unit lines. These automotive air conditioning tubes can be quite long, i.e., in excess of ten feet, can include several bends in the tubing, and/or may include several tube joints coupling sections of the tubing to achieve the final length.

The formation of tube joints using separate flanges, as shown in FIG. 1, at each junction of each of the sets of tubes requires multiple fasteners to attach sections of the pipes, resulting in undesirably high costs and undesirably complex manufacturing and assembly. Accordingly, dual flange systems have been developed for use with sets of pipes that run roughly parallel to one another.

FIG. 2 shows a perspective view of a prior art dual tube joint 34 joining first and second pipes 36 and 38, respectively, to third and fourth pipes 40 and 42, respectively. Tube joint 34 includes a flange 44 having a first passage sized to accommodate third pipe 40 and a second passage sized to accommodate fourth pipe 42. Flange 44 may be retained on each of third and fourth pipes 40 and 42 by brazing, cementing, or by flaring the end of each of third and fourth pipes 40 and 42 to a diameter that is larger than the first and second passages of flange 44.

Tube joint 34 further includes a hooked flange 46 retained on second pipe 38. Once the spigot pipe ends on, for example, first and second pipes 36 and 38, are inserted into the belled pipe ends on, for example, third and fourth pipes 40 and 42, hooked flange 46 is swiveled about second pipe 38 and hooked over first pipe 36. A wedge (not shown) may be forced about the hook portion of hooked flange 46 to secure first pipe 36. A bolt 48 is then directed through each of flange 44 and hooked flange 46 to form dual tube joint 34.

The combined use of flange 44 and hooked flange 46 is less costly and less complex than using separate flanges, as shown in FIG. 1. However, in some applications, a hooked flange may inadequately secure the pipes, depending upon the joint seal design and the pressure of the fluid carried in the pipes. In addition, flange 44 and hooked flange 46 can be bulky and difficult to handle during manufacturing. Moreover, a flange that includes a wedge design requires extra components, which is unwieldy for handling during manufacturing and assembly.

Thus, what is needed is an improved flange for retaining sets of tubes that run roughly parallel to one another.

SUMMARY OF THE INVENTION

Accordingly, it is an advantage of the present invention that a dual flange is provided for retaining tubes that run roughly parallel to one another.

It is another advantage of the present invention that a flange is provided that encircles the tubes to provide additional structural integrity at the tube joint.

Yet another advantage of the present invention is that a two section flange is provided that yields significant achievements in manufacturing flexibility.

The above and other advantages of the present invention are carried out in one form by a flange for retaining a first tube beside a second tube. The flange includes a first flange section configured to be coupled with the first tube, the first flange section having a first mating portion. The flange further includes a second flange section configured to be coupled with the second tube, the second flange section having a second mating portion. The first and second mating portions are connectable to retain the first tube beside the second tube.

The above and other advantages of the present invention are carried out in another form by a tube joint assembly. The tube joint assembly includes a first tube having a first female end and a second tube having a second female end. A third tube has a first male end seated in the first female end of the first tube. A fourth tube has a second male end seated in the second female end of the second tube. The tube joint assembly further includes a dual flange having a first flange section coupled with the first tube at the first female end, the first flange section having a first mating portion. A second flange section of the dual flange is coupled with the second tube, the second flange section having a second mating portion. A pin passes through each of the first and second mating portions for connecting the first flange section with the second flange section. A hooked flange of the tube joint assembly has a first opening through which the fourth tube is directed. The hooked flange is positioned proximate the second male end. The hooked flange has a hook portion configured to capture the third tube proximate the first male end to retain the third tube beside the fourth tube. A fastener extends through each of the first and second mating portions and the hooked flange for coupling the hooked flange to the dual flange.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 3:
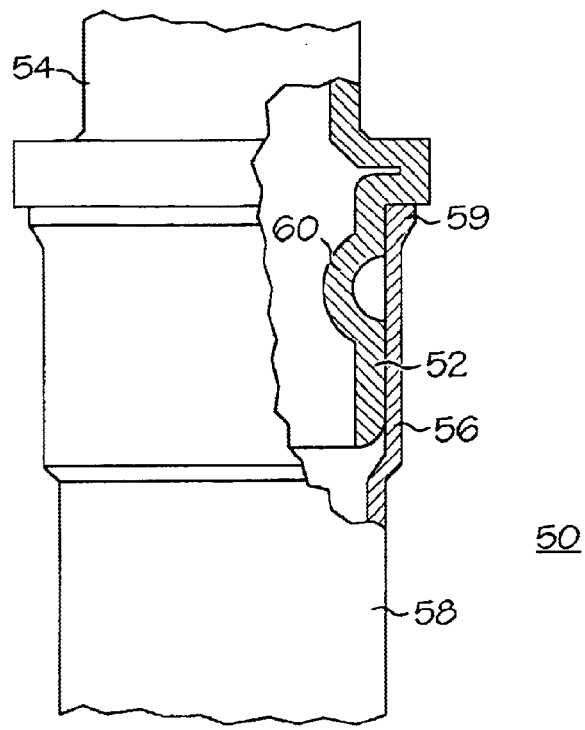
FIG. 3 shows a partial cutaway side view of an exemplary tube joint.

FIG. 3 shows a partial cutaway side view of an exemplary tube joint 50. Tube joint 50 is shown without flanges to illustrate the joining of tubes, or pipes, within the flanges of the present invention. As shown, tube joint 50 is formed by inserting a male (spigot) end 52 of a first tube 54 into a female (belled) end 56 of a second tube 58.

Male end 52 and female end 56 may be formed by end forming. End forming is a process in which the end of a tube is shaped to a specific roundness and concentricity specification. By end forming, each of male end 52 and female end 56 may be shaped to include an outwardly flared edge 59, such as that provided on female end 56 and/or a complex interior surface, such as bevels and grooves. As shown, male end 52 is end formed to include a circumferential groove 60. An o-ring (not shown) may be positioned in circumferential groove 60 between an exterior surface of first tube 54 and an interior surface of second tube 58 to form a seal.

Through end forming, second tube 58 is expanded to form female end 56. This expansion of second tube 58 causes the walls of second tube 58 at female end 56 to become thinner than the walls of the remaining length of second tube 58. The thinner walls can lead to failure of second tube 58 at female end 56, and the resulting leakage of the fluid carried by second tube 58.

The use of a flange encircling female end 56 can increase the structural integrity of second tube 58 at female end 56. In addition, flanges on each of first and second tubes 54 and 58, respectively, can be coupled together to facilitate the joining of first and second tubes 54 and 58, thereby increasing the strength of tube joint 50.

Tube joint 50 is shown for illustrative purposes only. Those skilled in the art will recognize that male end 52 and female end 56 can take on a number of different shapes depending upon the specific application. The present invention advantageously retains two sets of tubes, i.e. two each of first and second tubes 54 and 58, to facilitate the joining of two sets of roughly parallel tubes.

Figure 4:
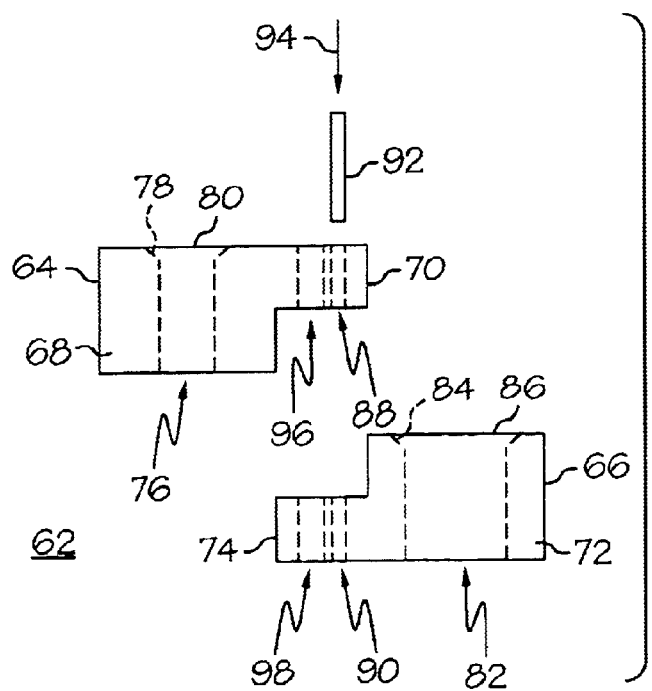
FIG. 4 shows an exploded side view of a dual flange in accordance with a preferred embodiment of the present invention.

FIG. 4 shows an exploded side view of a dual flange 62 in accordance with a preferred embodiment of the present invention. Dual flange 62 includes a first flange section 64 and a second flange section 66. First flange section 64 has a first body portion 68 and a first mating portion 70. Similarly, second flange section 66 has a second body portion 72 and a second mating portion 74.

First body portion 68 includes a first passage 76 having a first chamfered region 78, i.e., an outwardly beveled wall, located about a first end 80 of first passage 76. Likewise, second body portion 72 includes a second passage 82 having a second chamfered region 84, i.e., an outwardly beveled wall, located about a second end 86 of second passage 82.

First mating portion 70 includes a first hole 88, and second mating portion 74 includes a second hole 90. Dual flange 62 further includes a pin 92. First and second holes 88 and 90 are configured for axial alignment when second mating portion 74 is juxtaposed with first mating portion 70. As represented by an arrow 94, pin 92 is subsequently directed through first and second holes 88 and 90, respectively, to connect first flange section 64 to second flange section 66. Pin 92 may be a spring pin that exerts continuous spring pressure against the sides of first and second holes 88 and 90, thereby resisting loosening by vibration.

First mating portion 70 further includes a first opening 96 and second mating portion 74 further includes a second opening 98. First and second openings 96 and 98, respectively, are configured for axial alignment when second mating portion 74 is juxtaposed with first mating portion 70. First and second openings 96 and 98 are configured to enable passage of a fastener (not shown) for connecting dual flange 62 to an object, such as another flange, as discussed in further detail below.

First and second flange sections 64 and 66, respectively, of dual flange 62 may be machined from metal. Alternatively, first and second flange sections 64 and 66 of dual flange 62 may be manufactured from a thermoplastic material utilizing an injection molding technique.

Figure 5:
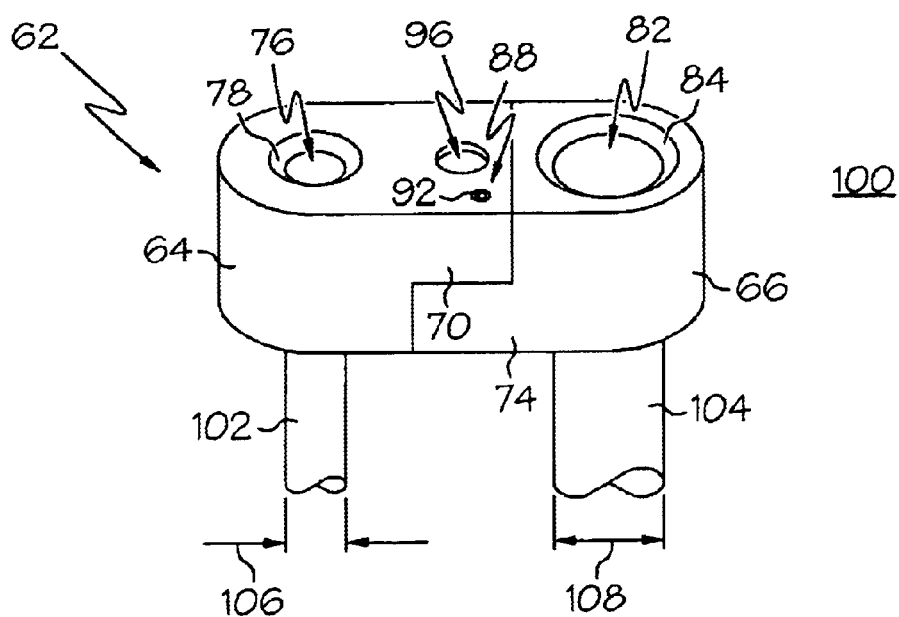
FIG. 5 shows a perspective view of a tube joint subassembly formed using the dual flange of FIG. 4.

FIG. 5 shows a perspective view of a tube joint subassembly 100 formed using dual flange 62. Dual flange 62 is configured to retain a first tube 102 beside a second tube 104. First passage 76 of first flange section 64 is sized to accommodate a first outer diameter 106 of first tube 102. More specifically, first passage 76 is sized to enable first flange section 64 to rotate about first tube 102. Similarly, second passage 82 of second flange section 66 is sized to accommodate a second outer diameter 108 of second tube 104, and to enable the rotation of second flange section 66 about second tube 104.

With first flange section 64 separate from second flange section 66, a method of manufacturing tube joint subassembly 100 entails installing first flange section 64 on first tube 102, installing second flange section 66 on second tube, then locking first and second flange sections 64 and 66 together to form a single piece dual flange 62.

More specifically, first tube 102 is directed through first passage 76 of the first flange section 64. Female end 56 (FIG. 3) with outwardly flared edge 59 (FIG. 3) is then generated at an end of first tube 102. Female end 56 may be generated by utilizing an end forming process, as discussed above. Outwardly flared edge 59 is configured to prevent the removal of the first flange section 64 from the end of the first tube 102. Outwardly flared edge 59 may then be seated in first chamfered region 78 of first passage 76. Once first flange section 64 is installed on first tube 102, first tube 102 may be further formed, bent, or otherwise processed.

The installation of second flange section 66 onto second tube 104 is performed in much the same manner as the installation of first flange section 64 onto first tube 102. Once installed, each of first and second flange sections 64 and 66, respectively, encircles first and second tubes 102 and 104, respectively, about their respective female ends 56. Thus, first and second flange sections 64 and 66 provide structural support at the thin walled region of first and second tubes 102 and 104.

Once each of first and second flange sections 64 and 66 are coupled with their respective first and second tubes 102 and 104, each of flange sections 64 and 66 may be rotated about tubes 102 and 104 in order to align first and second mating sections 70 and 74, respectively. The alignment of first and second mating sections 70 and 74 results in the alignment of first and second holes 88 and 90 (FIG. 4), respectively. First mating section 70 may then be fastened to second mating section 74 by installing pin 92 (FIG. 4) through first hole 88 and second hole 90. Consequently, tube joint subassembly 100 is formed that includes dual flange 62 retaining first tube 102 beside second tube 104.

First and second flange sections 64 and 66 are allowed to rotate about first and second tubes 102 and 104 to simplify the manufacture of tube joint subassembly 100. In addition, the formation of outwardly flared edge 59 on each of first and second tubes 102 and 104, to prevent the removal of first and second flange sections 64 and 66 from first and second tubes 102 and 104, precludes the need for employing a brazing technique to secure flange sections 64 and 66 onto tubes 102 and 104. By avoiding the use of brazing, cost savings is realized and leaks caused in part by brazing are avoided.

Figure 1:
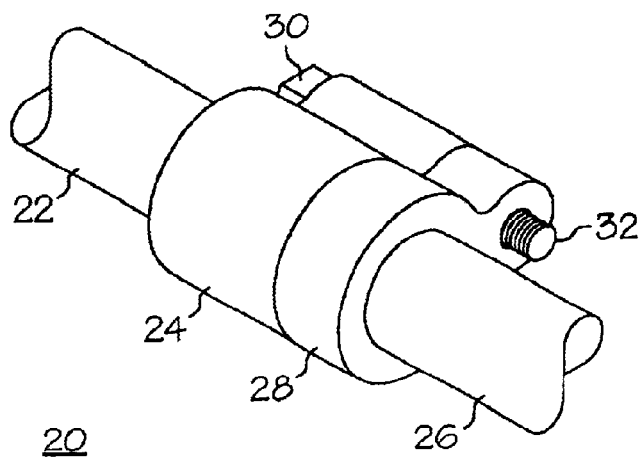
FIG. 1 shows a perspective view of a prior art single tube joint.
Figure 2:
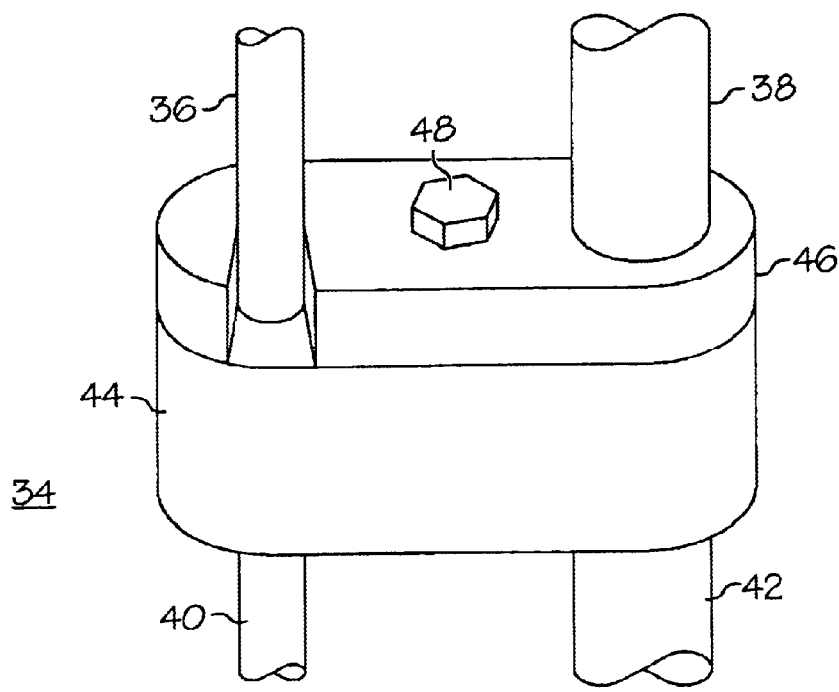
FIG. 2 shows a perspective view of a prior art dual tube joint joining first and second pipes to respective ones of third and fourth pipes.

The individual assembly processes for each of the first and second tubes 102 and 104 allows for greater manufacturing flexibility than the prior art single piece flange 44, described in connection with FIG. 2. That is, first and second tubes 102 and 104 can be processed with small individual first and second flange sections 64 and 66. First and second flange sections 64 and 66 are then locked together at some subsequent point in the manufacturing process when convenient.

Although the above described installation of first and second flange sections 64 and 66 is preferred, it should be apparent to those skilled in the art that in an alternative embodiment first flange section 64 may be fixedly coupled to first tube 102 and second flange section 66 may be fixedly coupled to second tube 104, by brazing, cementing, or some other fixation technique known to those skilled in the art.

Figure 6:
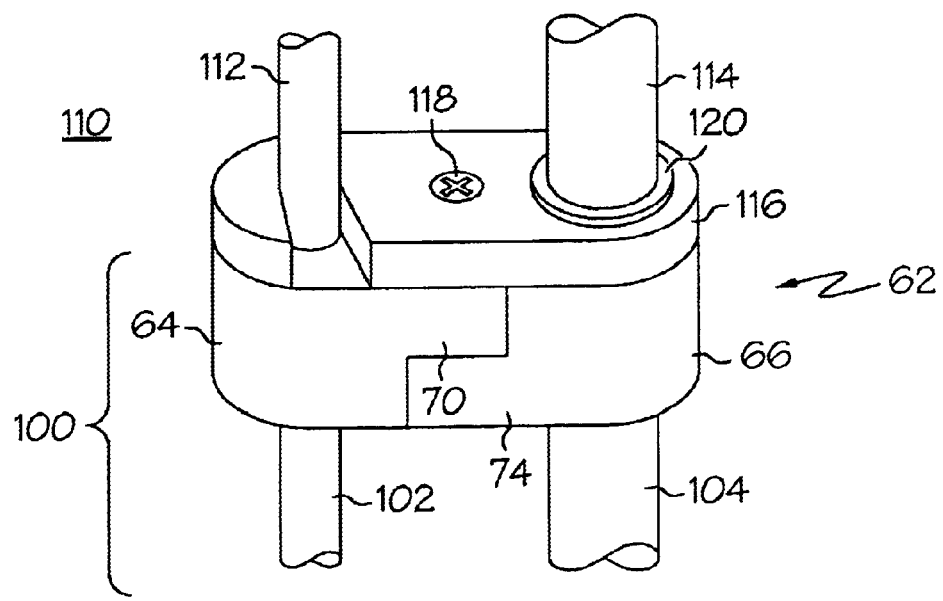
FIG. 6 shows a perspective view of a tube joint assembly formed using the tube joint subassembly of FIG. 5.

FIG. 6 shows a perspective view of a tube joint assembly 110 formed using tube joint subassembly 100. Tube joint assembly 110 further includes a third tube 112, a fourth tube 114, a hooked flange 116, and a fastener 118. Third tube 112 has male end 52 (FIG. 3) in fluid communication with female end 56 (FIG. 3) of first tube 102. Similarly, fourth tube 114 has male end 52 (FIG. 3) in fluid communication with female end 56 (FIG. 3) of second tube 104.

Hooked flange 116, located proximate male end 52 of fourth tube 114, has an opening 120 through which fourth tube 114 is directed. Opening 120 is sized to enable hooked flange 116 to rotate about fourth tube 114. Fourth tube 114 may be end formed in a manner that prevents the removal of hooked flange 116. In addition, third and fourth tubes 112 and 114, respectively, are formed, bent, or otherwise processed prior to the fabrication of tube joint assembly 110.

In a preferred embodiment, tube joint subassembly 100 is formed prior to the fabrication of tube joint assembly 110. The subsequent fabrication of tube joint assembly 110 includes inserting male end 52 (FIG. 3) of third tube 112 through first passage 76 (FIG. 5) of first flange section 64 and into female end 56 (FIG. 3) of first tube 102. Similarly, male end 52 of fourth tube 114 is inserted through second passage 82 (FIG. 5) of second flange section 66 and into female end 56 of second tube 104. Next, hooked flange 116 is swiveled about fourth tube 114 to capture third tube 112 proximate the end of third tube 112, and to retain third tube 112 beside fourth tube 114. Fastener 118 is then extended through hooked flange 116 and through respective first and second openings 96 and 98 (FIG. 4) in each of first and second mating portions 70 and 74 to couple hooked flange 116 to dual flange 62. Thus, a stable tube joint assembly 110 is formed for retaining two sets of roughly parallel tubes (i.e. first tube 102 with third tube 112, and second tube 104 with fourth tube 114).

In a preferred embodiment, the male ends of third and fourth tubes 112 and 114, respectively, are inserted into respective female ends of first and second tubes 102 and 104. However, it should be understood that in an alternative embodiment, the inner wall of first passage 76 may serve as a conduit for fluid communication between first tube 102 and third tube 112. Similarly, the inner wall of second passage 82 may serve as a conduit for fluid communication between second tube 104 and fourth tube 114.

Figure 7:
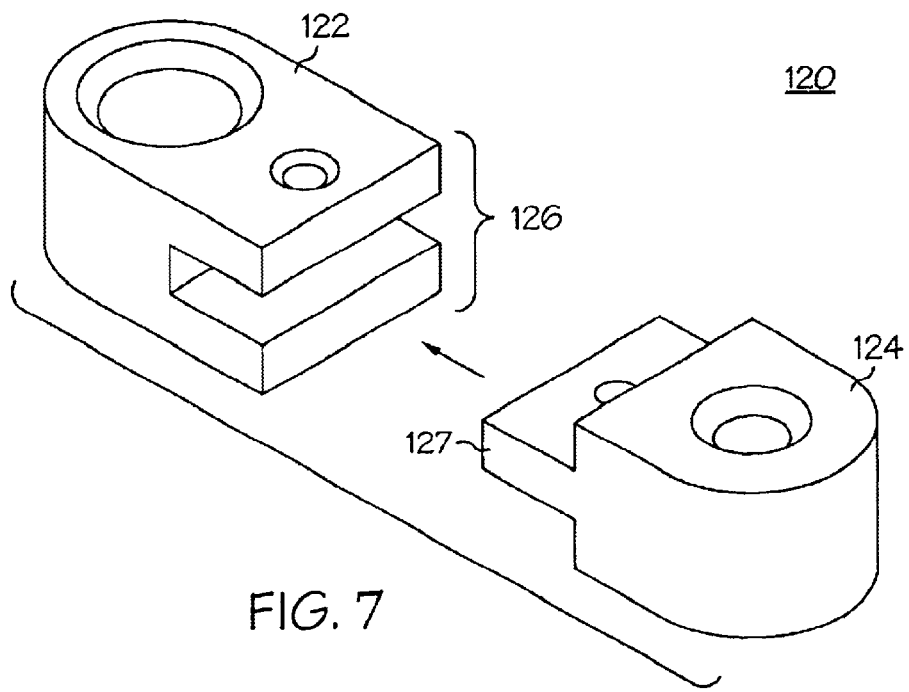
FIG. 7 shows a exploded perspective view of a dual flange in accordance with an alternative embodiment of the present invention.

FIG. 7 shows a exploded perspective view of a dual flange 120 in accordance with an alternative embodiment of the present invention. Dual flange 120 includes a first flange section 122 and a second flange section 124. First and second flange sections 122 and 124 have many of the same features as first and second flange sections 64 and 66 (FIG. 4). Moreover, when first and second flange sections 122 and 124 are coupled together, dual flange 120 functions similarly to dual flange 62 (FIG. 4).

However, as shown in FIG. 7, a first mating portion of first flange section 122 takes the form of a groove 126, and a second mating portion of second flange section 124 takes the form of a tongue 127. Tongue 127 is configured to fit into groove 126 to couple first and second flange sections 122. The tongue and groove feature of dual flange 120 precludes the need for an additional fastener, such as pin 92 (FIG. 4) for connecting first and second flange sections 122 and 124, respectively.

Figure 8:
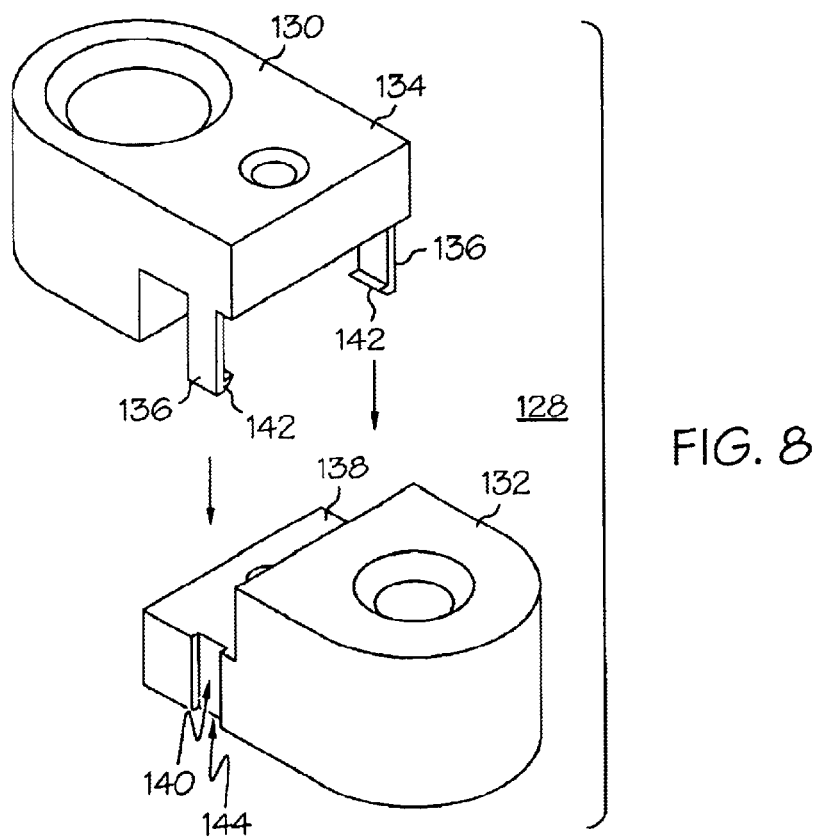
FIG. 8 shows a exploded perspective view of a dual flange in accordance with another alternative embodiment of the present invention.

FIG. 8 shows a exploded perspective view of a dual flange 128 in accordance with another alternative embodiment of the present invention. Dual flange 128 includes a first flange section 130 and a second flange section 132. First and second flange sections 130 and 132 have many of the same features as first and second flange sections 64 and 66 (FIG. 4). Moreover, when first and second flange sections 122 and 124 are coupled together, dual flange 128 functions similarly to dual flanges 62 (FIG. 4) and 120 (FIG. 7).

However, as shown in FIG. 8, a first mating portion 134 of first flange section 130 further includes downwardly extending tabs 136. A second mating portion 138 of second flange section 132 includes indents 140, of which one is shown, sized to accommodate tabs 136. In use, tabs 136 of first mating portion 134 releasably couple with second mating portion 138 at indents 140. That is, tabs 136 deflect outwardly when pressure in the form of second mating portion 138 is applied to tabs 136. Once seated in indents 140, tabs 136 then spring inwardly so that hooks 142 are secured to an underside 144 of second mating portion 138.

The use of tabs 136 on dual flange 128 precludes the need for an additional fastener, such as pin 92 (FIG. 4) for connecting first and second flange sections 130 and 132, respectively. Moreover, first and second flange sections 130 and 132 are readily locked together or released without the need of an extraction tool, such as that which might be needed to remove pin 92. First and second flange sections 130 and 132 of dual flange 128 may be readily and inexpensively fabricated from a thermoplastic material utilizing an injection molding technique.

Figure 9:
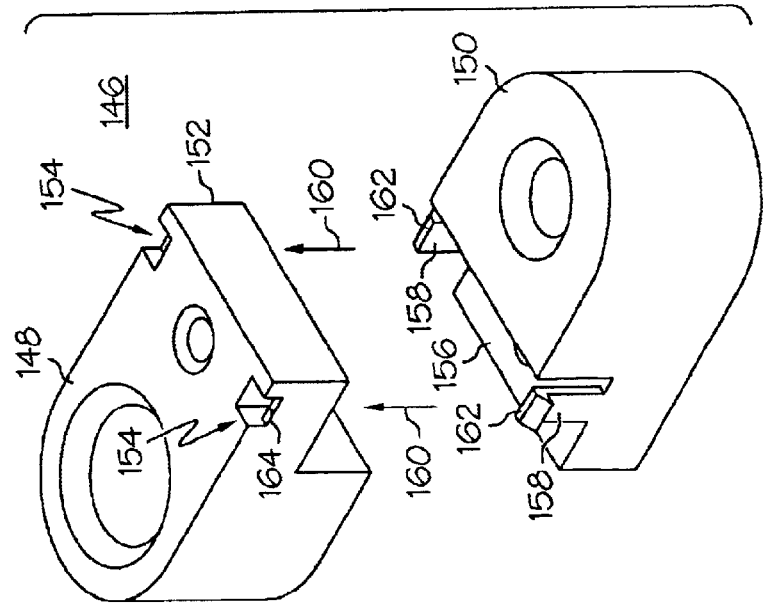
FIG. 9 shows a exploded perspective view of a dual flange in accordance with another alternative embodiment of the present invention.

FIG. 9 shows a exploded perspective view of a dual flange 146 in accordance with another alternative embodiment of the present invention. Dual flange 146 includes a first flange section 148 and a second flange section 150. As shown in FIG. 9, a first mating portion 152 of first flange section 148 further includes sockets 154. A second mating portion 156 of second flange section 150 includes tabs 158. In use, tabs 158 of second mating portion 156 releasably couple with sockets 154. That is, tabs 158 slide into sockets 154, in a direction indicated by arrows 160 and deflect outwardly when seated in sockets 154. Each of tabs 158 includes a hook 162 that subsequently catches on a lip portion 164 of each of sockets 154 so that tabs 158 are secured in sockets 154.

The use of tabs 158 mating with sockets 154 on dual flange 146 precludes the need for an additional fastener, such as pin 92 (FIG. 4) for connecting first and second flange sections 130 and 132, respectively. Moreover, like dual flange 128, first and second flange sections 148 and 150 are readily locked together or released without the need of an extraction tool, such as that which might be needed to remove pin 92. First and second flange sections 148 and 150 of dual flange 146 may be readily and inexpensively fabricated from a thermoplastic material utilizing an injection molding technique.

Figure 10:
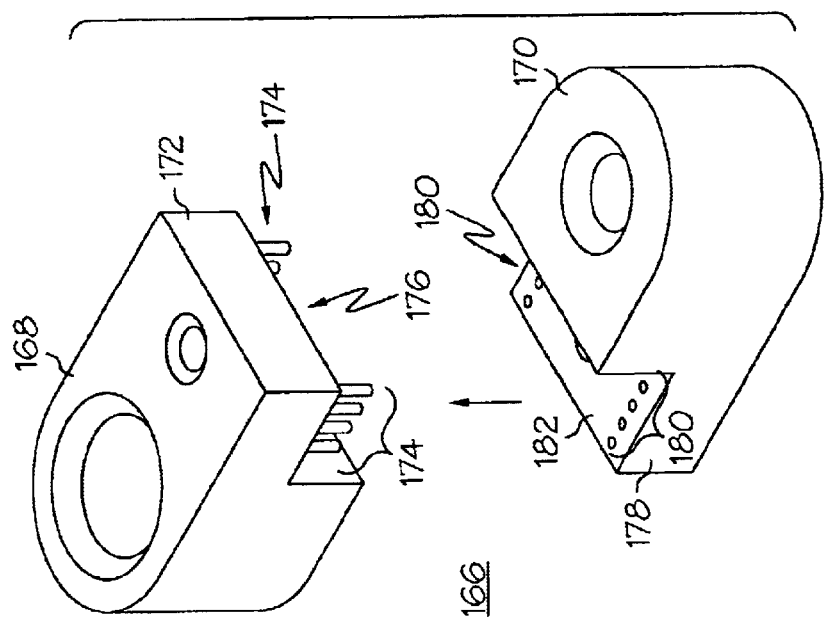
FIG. 10 shows a exploded perspective view of a dual flange in accordance with yet another alternative embodiment of the present invention.

FIG. 10 shows a exploded perspective view of a dual flange 166 in accordance with yet another alternative embodiment of the present invention. Dual flange 166 includes a first flange section 168 and a second flange section 170. As shown in FIG. 10, a first mating portion 172 of first flange section 168 further includes posts 174 extending from a surface 176 of first mating portion. A second mating portion 178 of second flange section 170 includes sockets 180 extending into a surface 182 of second mating portion 178. In use, posts 174 of first mating portion 172 are inserted into sockets 180 of second mating portion 178 to releasably couple first flange section 168 with second flange section 170.

Like some of the dual flanges discussed above, the use of posts 174 mating with sockets 180 on dual flange 166 precludes the need for an additional fastener, such as pin 92 (FIG. 4) for connecting first and second flange sections 130 and 132, respectively. Moreover, like some of the dual flanges discussed above, first and second flange sections 168 and 170 are readily pressed together or released without the need of an extraction tool, such as that which might be needed to remove pin 92. First and second flange sections 168 and 170 of dual flange 166 may also be readily and inexpensively fabricated from a thermoplastic material utilizing an injection molding technique.

In summary, the present invention teaches of a dual flange for retaining tubes that run roughly parallel to one another. The dual flange encircles the tubes thus providing additional structural integrity at a tube joint. The features of individual assembly of a flange section with a pipe, and the subsequent locking together of two flange sections to form the dual flange yields significant advancements in manufacturing flexibility and cost savings over prior flanges for parallel tube assemblies.

Although the preferred embodiments of the invention have been illustrated and described in detail, it will be readily apparent to those skilled in the art that various modifications may be made therein without departing from the spirit of the invention or from the scope of the appended claims. For example, the form and size of the inner passages of the flange sections through which the tubes are directed are driven by the profile of the tubes.

What is claimed is:

1. A flange for retaining a first tube beside a second tube, said flange comprising:
    a first flange section configured to be coupled with said first tube, said first flange section having a first mating portion and a first body portion, said first body portion being configured to encircle said first tube;
    a second flange section configured to be coupled with said second tube, said second flange section having a second mating portion and a second body portion, said second body portion being configured to encircle said second tube, and said first and second mating portions being connectable to retain said first tube beside said second tube; and
    said mating portions having a smaller thickness than said respective body portions, said mating portions extending substantially perpendicular to the longitudinal axes of the first and second tubes.

2. A flange as claimed in claim 1 wherein:
    said first body portion has a first passage sized to accommodate a first outer diameter of said first tube; and
    said second body portion has a second passage sized to accommodate a second outer diameter of said second tube.

3. A flange as claimed in claim 2 wherein each of said first and second tubes includes a flared end, and said flange further comprises:
    a first chamfered region located about a first end of said first passage into which said flared end of said first tube is configured to be positioned; and
    a second chamfered region located about a second end of said second passage into which said flared end of said second tube is configured to be positioned.

4. A flange as claimed in claim 2 wherein:
    said first passage is sized to enable said first flange section to rotate about said first tube; and
    said second passage is sized to enable said second flange section to rotate about said second tube.

5. A flange as claimed in claim 1 wherein:
    said first flange section is configured to be fixedly coupled to said first tube; and
    said second flange section is configured to be fixedly coupled to said second tube.

6. A flange as claimed in claim 1 wherein:
    said first mating portion of said first flange section includes a first hole;
    said second mating portion of said second flange section includes a second hole, said first and second holes being configured for axial alignment; and
    said flange further comprises a pin, said pin being directed through each of said first and second holes to connect said first flange section to said second flange section.

7. A flange as claimed in claim 1 wherein said first mating portion of said first flange section is a groove, and said second mating portion of said second flange section is a tongue configured to fit in said groove.

8. A flange as claimed in claim 1 wherein said first mating portion of said first flange section includes a tab configured to releasably couple with said second mating portion of said second flange section.

9. A flange as claimed in claim 1 wherein:
said first mating portion of said first flange section includes a post extending from a first surface of said first mating portion; and
said second mating portion of said second flange section includes a socket extending into a second surface of said second mating portion, said post being configured to releasably couple with said socket.

10. A flange as claimed in claim 1 wherein said flange is configured for coupling to an object, said first mating portion of said first flange section has a first opening, said second mating portion of said second flange section has a second opening, and said first and second openings are axially aligned and configured to enable passage of a fastener for connecting said flange to said object.

11. A tube joint assembly comprising:
a first tube having a first female end;
a second tube having a second female end;
a third tube having a first male end in fluid communication with said first female end of said first tube;
a fourth tube having a second male end in fluid communication with said second female end of said second tube;
a dual flange including:
a first flange section coupled with said first tube at said first female end, said first flange section having a first mating portion and a first body portion encircling said first tube;
a second flange section coupled with said second tube, said second flange section having a second mating portion and a second body portion encircling said second tube; and
a pin passing through each of said first and second mating portions for connecting said first flange section with said second flange section;
a hooked flange having an opening through which said fourth tube is directed, said hooked flange being positioned proximate said second male end, and said hooked flange having a hook portion configured to capture said third tube proximate said first male end to retain said third tube beside said fourth tube; and
a fastener extending through each of said first and second mating portions and said hooked flange for coupling said hooked flange to said dual flange.

12. A tube joint assembly as claimed in claim 11 wherein said first tube, said second tube, and said flange form a subassembly when said pin is passed through said each of said first and second mating portions, said subassembly being formed prior to attachment of said third tube, said fourth tube, and said hooked flange to said subassembly.

13. A method of retaining a first tube beside a second tube, said method comprising:
directing said first tube through a first passage of a first flange section so that said first flange section encircles said first tube;
generating a first outwardly flared portion at a first end of said first tube, said first outwardly flared portion preventing said first flange section from being removable from said first tube at said first end;
directing said second tube through a second passage of a second flange section so that said second flange section encircles said second tube;
generating a second outwardly flared portion at a second end of said second tube, said second outwardly flared portion preventing said second flange section from being removable from said second tube at said second end; and
fastening a first mating portion of said first flange section to a second mating portion of said second flange section to retain said first tube beside said second tube.

14. A method as claimed in claim 13 wherein said first passage is sized to enable said first flange section to rotate about said first tube, said second passage is sized to enable said second flange section to rotate about said second tube, and said method further comprises rotating each of said first and second flange sections about respective ones of said first and second tubes to align said first and second mating portions.

15. A method as claimed in claim 13 wherein said fastening operation comprises:
aligning a first hole in said first mating portion of said first flange section with a second hole in said second mating portion of said second flange section; and
directing a pin through each of said first and second holes to connect said first flange section to said second flange section.

16. A method as claimed in claim 13 wherein said first mating portion of said first flange section includes a tab, and said fastening operation comprises releasably coupling said tab with said second mating portion to connect said first flange section to said second flange section.

17. A flange for retaining a first tube beside a second tube, said flange comprising:
a first flange section configured to be coupled with said first tube, said first flange section including a first body portion and a first mating portion, said first body portion having a first passage sized to accommodate a first outer diameter of said first tube, said first body portion being configured to encircle said first tube, and said first mating portion including a first hole;
a second flange section configured to be coupled with said second tube, said second flange section including a second body portion and a second mating portion, said second body portion having a second passage sized to accommodate a second outer diameter of said second tube, said second body portion being configured to encircle said second tube, and said second mating portion including a second hole;
a pin directed through each of said first and second holes to connect said first mating portion of said first flange section to said second mating portion of said second flange section; and
said mating portions having smaller thickness than said respective body portions, said mating portions extending substantially perpendicular to the longitudinal axes of the first and second tubes.

18. A flange as claimed in claim 17 wherein each of said first and second tubes includes a flared end, and said flange further comprises:
a first chamfered region located about a first end of said first passage into which said flared end of said first tube is configured to be positioned; and a second chamfered region located about a second end of said second passage into which said flared end of said second tube is configured to be positioned.

19. A flange as claimed in claim 17 wherein:

said first passage is sized to enable said first flange section to rotate about said first tube; and said second passage is sized to enable said second flange section to rotate about said second tube.

20. A flange as claimed in claim 17 wherein said flange is configured for coupling to an object, said first mating portion of said first flange section has a first opening, said second mating portion of said second flange section has a second opening, and said first and second openings are axially aligned and configured to enable passage of a fastener for connecting said flange to said object.

* * * * *